United States Patent
Kinoshita

(10) Patent No.: US 10,668,855 B2
(45) Date of Patent: Jun. 2, 2020

(54) DETECTION APPARATUS, IMAGING APPARATUS, VEHICLE, AND DETECTION METHOD

(71) Applicant: KYOCERA Corporation, Kyoto (JP)

(72) Inventor: Kenta Kinoshita, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/747,196

(22) PCT Filed: Jul. 29, 2016

(86) PCT No.: PCT/JP2016/003529
§ 371 (c)(1),
(2) Date: Jan. 24, 2018

(87) PCT Pub. No.: WO2017/017967
PCT Pub. Date: Feb. 2, 2017

(65) Prior Publication Data
US 2018/0208114 A1    Jul. 26, 2018

(30) Foreign Application Priority Data
Jul. 29, 2015    (JP) .................................. 2015-149857

(51) Int. Cl.
*B60R 21/00*    (2006.01)
*B60W 40/00*    (2006.01)
(Continued)

(52) U.S. Cl.
CPC ................ *B60R 1/00* (2013.01); *B60R 21/00* (2013.01); *B60W 30/06* (2013.01); *G06T 1/00* (2013.01);
(Continued)

(58) Field of Classification Search
CPC ..... B60R 1/00; B60R 21/00; B60R 2300/105; B60R 2300/8093; B60W 40/02; B60W 30/06; G06T 2207/30264; G06T 1/00
See application file for complete search history.

(56) References Cited

U.S. PATENT DOCUMENTS 2,610,364 A * 9/1952 Brower .................... E04H 6/10
52/174
3,105,221 A * 9/1963 Schwarz ................... E04H 6/42
235/99 A
(Continued)

FOREIGN PATENT DOCUMENTS

JP    H06-111198 A    4/1994
JP    2003-159994 A    6/2003
(Continued)

OTHER PUBLICATIONS

International Search Report issued in PCT/JP2016/003529; dated Oct. 11, 2016.
(Continued)

*Primary Examiner* — Philip P. Dang
(74) *Attorney, Agent, or Firm* — Studebaker & Brackett PC

(57) ABSTRACT

A detection apparatus includes an image acquisition interface and a controller. The image acquisition interface acquires captured images from an imaging apparatus that is installed in a vehicle and captures images of an area surrounding the vehicle. The controller calculates, on the basis of the captured images, the distance from the imaging apparatus to a road edge in the width direction of the road on which the vehicle is traveling or to an obstacle on the road and determines, on the basis of the calculated distance and information on an outer dimension of the vehicle, whether
(Continued)

travel on the road by other vehicles will be possible after the vehicle has parked on the road.

8 Claims, 11 Drawing Sheets

(51) Int. Cl.
| | | |
|---|---|---|
| *B60R 1/00* | (2006.01) | |
| *B60W 30/06* | (2006.01) | |
| *G06T 1/00* | (2006.01) | |
| *G08G 1/16* | (2006.01) | |
| *B60W 40/02* | (2006.01) | |

(52) U.S. Cl.
CPC ............ *G08G 1/165* (2013.01); *G08G 1/166* (2013.01); *G08G 1/168* (2013.01); *B60R 2300/105* (2013.01); *B60R 2300/8093* (2013.01); *B60W 40/02* (2013.01); *G06T 2207/30264* (2013.01)

(56) References Cited

U.S. PATENT DOCUMENTS

| | | | | |
|---|---|---|---|---|
| 5,526,357 | A * | 6/1996 | Jandrell | G01S 5/0009 340/991 |
| 6,057,754 | A * | 5/2000 | Kinoshita | B62D 1/28 340/435 |
| 6,611,744 | B1 * | 8/2003 | Shimazaki | B60R 1/00 180/168 |
| 6,825,880 | B2 * | 11/2004 | Asahi | B60Q 9/005 340/932.2 |
| 6,885,968 | B2 * | 4/2005 | Breed | B60Q 9/008 702/142 |
| 7,049,945 | B2 * | 5/2006 | Breed | B60Q 9/008 340/435 |
| 7,164,117 | B2 * | 1/2007 | Breed | B60R 21/01516 250/208.1 |
| 7,209,221 | B2 * | 4/2007 | Breed | B60N 2/002 356/28 |
| 7,295,227 | B1 * | 11/2007 | Asahi | B60R 1/00 348/118 |
| 7,359,782 | B2 * | 4/2008 | Breed | B60R 21/0134 701/45 |
| 7,518,490 | B2 | 4/2009 | Takenaga et al. | |
| 7,535,126 | B2 * | 5/2009 | Matsumoto | G01R 1/203 307/112 |
| 7,630,806 | B2 * | 12/2009 | Breed | B60R 21/0134 180/273 |
| 7,663,502 | B2 * | 2/2010 | Breed | B60C 11/24 340/12.25 |
| 7,783,403 | B2 * | 8/2010 | Breed | B60R 21/0134 340/435 |
| 7,825,784 | B2 * | 11/2010 | Yamanaka | B60R 1/00 340/435 |
| 7,990,283 | B2 * | 8/2011 | Breed | B60N 2/2863 340/903 |
| 8,134,480 | B2 * | 3/2012 | Onome | G08G 1/096716 340/905 |
| 8,189,962 | B2 * | 5/2012 | Ito | G06K 9/00369 345/619 |
| 8,289,391 | B2 * | 10/2012 | Kiyohara | G06K 9/342 348/148 |
| 8,442,763 | B2 * | 5/2013 | Tuck | G01C 21/30 701/445 |
| 8,504,293 | B2 * | 8/2013 | Ishikawa | G01C 21/30 340/425.5 |
| 8,560,169 | B2 * | 10/2013 | Sasajima | G08G 1/14 340/932.2 |
| 8,615,351 | B2 * | 12/2013 | Ueda | B60W 10/08 701/300 |
| 8,825,353 | B2 * | 9/2014 | Mori | G08G 1/0104 701/118 |
| 8,868,255 | B2 * | 10/2014 | Yoshioka | B62D 1/00 340/435 |
| 8,944,456 | B2 * | 2/2015 | Tsukerman | B62D 21/14 280/638 |
| 9,026,351 | B2 * | 5/2015 | Morimoto | G01C 21/3453 701/409 |
| 9,069,080 | B2 * | 6/2015 | Stettner | G01S 17/023 |
| 9,321,485 | B2 * | 4/2016 | Park | B62D 15/0285 |
| 9,328,886 | B2 * | 5/2016 | Guan | B60Q 9/008 |
| 9,361,529 | B2 * | 6/2016 | Ryu | G06K 9/00812 |
| 9,441,331 | B2 * | 9/2016 | Chen | E01C 1/04 |
| 9,511,800 | B2 * | 12/2016 | Lee | B62D 15/0285 |
| 9,644,986 | B2 * | 5/2017 | Kumagai | B60R 1/00 |
| 9,690,996 | B2 * | 6/2017 | Utagawa | H04N 5/225 |
| 9,864,064 | B2 * | 1/2018 | Ishigami | G01C 21/28 |
| 2004/0130464 | A1 | 7/2004 | Schindler et al. | |
| 2006/0208169 | A1 * | 9/2006 | Breed | B60N 2/002 250/221 |
| 2007/0008091 | A1 | 1/2007 | Takenaga et al. | |
| 2007/0057816 | A1 * | 3/2007 | Sakakibara | B62D 15/027 340/932.2 |
| 2007/0063874 | A1 * | 3/2007 | Danz | B60Q 9/006 340/932.2 |
| 2010/0274446 | A1 * | 10/2010 | Sasajima | G08G 1/14 701/36 |
| 2013/0085636 | A1 | 4/2013 | You et al. | |
| 2013/0166190 | A1 * | 6/2013 | Ikeda | B62D 15/0285 701/400 |
| 2014/0297172 | A1 * | 10/2014 | Huelsen | G01S 13/931 701/301 |
| 2014/0309853 | A1 * | 10/2014 | Ricci | H04W 4/21 701/34.4 |
| 2015/0014077 | A1 * | 1/2015 | Tsitimakis | B60S 9/205 180/199 |
| 2015/0054661 | A1 * | 2/2015 | Noh | G08G 1/141 340/932.2 |
| 2015/0070196 | A1 * | 3/2015 | Beaurepaire | G08G 1/162 340/932.2 |
| 2015/0100177 | A1 * | 4/2015 | Inagaki | B60W 30/06 701/1 |
| 2015/0151789 | A1 * | 6/2015 | Lee | B62D 15/0285 701/41 |
| 2015/0202939 | A1 * | 7/2015 | Stettner | B60R 21/0134 701/37 |
| 2016/0068187 | A1 * | 3/2016 | Hata | B62D 15/0285 701/41 |

FOREIGN PATENT DOCUMENTS

| | | |
|---|---|---|
| JP | 2006-344009 A | 12/2006 |
| JP | 2007-272276 A | 10/2007 |
| JP | 2009-037408 A | 2/2009 |
| JP | 2010269707 A | 12/2010 |
| WO | 2011/132309 A1 | 10/2011 |

OTHER PUBLICATIONS

Written Opinion issued in PCT/JP2016/003529; dated Oct. 11, 2016.

* cited by examiner

DETECTION APPARATUS, IMAGING APPARATUS, VEHICLE, AND DETECTION METHOD

CROSS-REFERENCE TO RELATED APPLICATION

The present application claims priority to and the benefit of Japanese Patent Application No. 2015-149857 filed Jul. 29, 2015, the entire contents of which are incorporated herein by reference.

TECHNICAL FIELD

The present disclosure relates to a detection apparatus, an imaging apparatus, a vehicle, and a detection method.

BACKGROUND

A technique is known for detecting a parking space using distance data obtained by calculation on the basis of an image captured by an on-vehicle camera. However, on a road which does not have parking lines, simply detecting a parking space allows a vehicle to park but the vehicle may block the movement of other vehicles or become an obstacle for other vehicles depending on the surrounding conditions, such as the road width.

SUMMARY

A detection apparatus according to an embodiment of the present disclosure includes an image acquisition interface and a controller. The image acquisition interface is configured to acquire captured images from an imaging apparatus that is installed in a vehicle and captures images of an area surrounding the vehicle. The controller is configured to calculate, on the basis of the captured images, a distance from the imaging apparatus to a road edge in a width direction of a road on which the vehicle is traveling or to an obstacle on the road. The controller is configured to determine, on the basis of the calculated distance and information on an outer dimension of the vehicle, whether travel on the road by other vehicles will be possible after the vehicle has parked on the road.

An imaging apparatus according to an embodiment of the present disclosure includes an image sensor and a controller. The image sensor is installed in a vehicle and generates captured images of an area surrounding the vehicle. The controller is configured to calculate, on the basis of the captured images, a distance from the image sensor to a road edge in a width direction of a road on which the vehicle is traveling or to an obstacle on the road. The controller is configured to determine, on the basis of the calculated distance and information on an outer dimension of the vehicle, whether travel on the road by other vehicles will be possible after the vehicle has parked on the road.

A vehicle according to an embodiment of the present disclosure is a vehicle with an imaging apparatus installed therein, the imaging apparatus comprising an image acquisition interface and a controller. The image acquisition interface is configured to acquire captured images from the imaging apparatus that is installed in the vehicle and captures images of an area surrounding the vehicle. The controller is configured to calculate, on the basis of the captured images, a distance from the imaging apparatus to a road edge in a width direction of a road on which the vehicle is traveling or to an obstacle on the road. The controller is configured to determine, on the basis of the calculated distance and information on an outer dimension of the vehicle, whether travel on the road by other vehicles will be possible after the vehicle has parked on the road.

A detection method according to an embodiment of the present disclosure is used in a detection apparatus and comprises acquiring captured images from an imaging apparatus that is installed in a vehicle and captures images of an area surrounding the vehicle. The detection method, according to an embodiment of the present disclosure, that is used in a detection apparatus further comprises calculating, on the basis of the captured images, a distance from the imaging apparatus to a road edge in a width direction of a road on which the vehicle is traveling or to an obstacle on the road. The detection method, according to an embodiment of the present disclosure, that is used in a detection apparatus further comprises determining, on the basis of the calculated distance and information on an outer dimension of the vehicle, whether travel on the road by other vehicles will be possible after the vehicle has parked on the road.

DETAILED DESCRIPTION

A detection apparatus according to an embodiment of the present disclosure includes an image acquisition interface and a controller. On the basis of captured images acquired by the image acquisition interface, the controller detects the edge of the road on which the vehicle is traveling or an obstacle on the road and calculates the distance to the detected road edge or obstacle. On the basis of the calculated distance and information on the outer dimension of the vehicle, the controller determines whether travel on the road by other vehicles will be possible after the vehicle has parked on the road. Therefore, the detection apparatus can determine whether the vehicle can park in a parking space without parking lines, for example, after taking into consideration the size of the vehicle to determine whether there is room for other vehicles to travel on the road. Accordingly, the detection apparatus can detect an appropriate parking position that does not obstruct other vehicles. Furthermore, the detection apparatus can implement automatic parking at low cost without necessarily increasing the number of on-vehicle devices. An embodiment of the present disclosure is described below with reference to the drawings.

Figure 1:
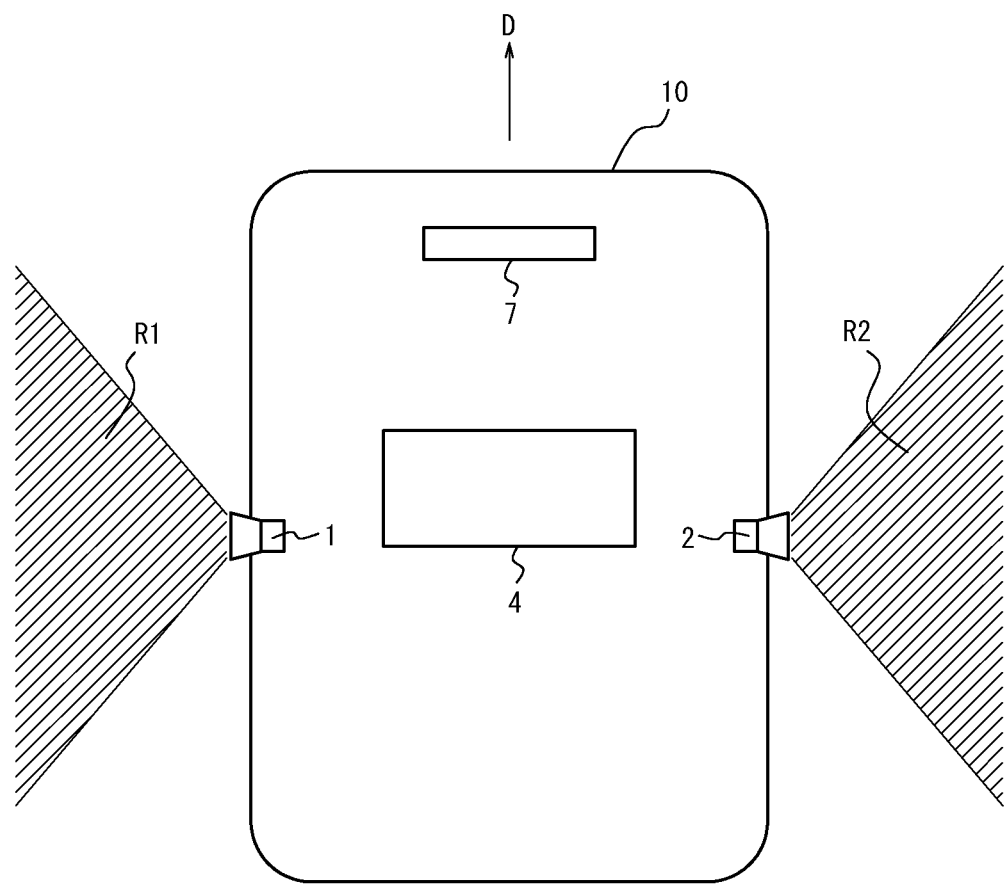
FIG. 1 illustrates a vehicle according to an embodiment of the present disclosure.

FIG. 1 is a simplified view of a vehicle 10 that is traveling on a road. The vehicle 10 is traveling in the direction of the arrow D. At least a first imaging apparatus 1, a second imaging apparatus 2, a detection apparatus 4, and a display apparatus 7 are installed in the vehicle 10. The term "vehicle" in the present embodiment encompasses automobiles, industrial vehicles, and vehicles for daily life. Automobiles include, but are not limited to, passenger vehicles, trucks, buses, motorcycles, and trolley buses, and may include other vehicles that travel on the road. Industrial vehicles include industrial vehicles for agriculture and for construction. Industrial vehicles include, but are not limited to, forklifts and golf carts. Industrial vehicles for agriculture include, but are not limited to, tractors, cultivators, transplanters, binders, combines, and lawnmowers. Industrial vehicles for construction include, but are not limited to, bulldozers, scrapers, backhoes, cranes, dump cars, and road rollers. Vehicles for daily life include, but are not limited to, bicycles, wheelchairs, baby carriages, wheelbarrows, and motorized, two-wheeled standing vehicles. Power engines for the vehicle include, but are not limited to, internal-combustion engines including diesel engines, gasoline engines, and hydrogen engines, and electrical engines including motors. The term "vehicle" includes man-powered vehicles. The vehicle is not limited to the above-listed types. For example, automobiles may include industrial vehicles that can travel on the road, and the same vehicle may be included in multiple categories.

The first imaging apparatus 1 and the second imaging apparatus 2 are side cameras with an image sensing function. A charge coupled device (CCD) or a complementary metal oxide semiconductor (CMOS), for example, is suitably used as such a side camera. The first imaging apparatus 1 and the second imaging apparatus 2 are each fixed at the same height position, with the optical axis oriented towards or slightly downward from the horizontal direction, and can capture various subjects, such as the road edges, obstacles, and the like. The first imaging apparatus 1 in the present embodiment is installed on the left side of the vehicle 10 when viewing the vehicle 10 in the direction of travel thereof and captures subjects in an area R1 to the left of the vehicle 10.

The second imaging apparatus 2 is installed on the right side of the vehicle 10 when viewing the vehicle 10 in the direction of travel thereof and captures subjects in an area R2 to the right of the vehicle 10. The first imaging apparatus 1 and the second imaging apparatus 2 are, for example, installed on the side mirrors.

In the present embodiment, the first imaging apparatus 1 and the second imaging apparatus 2 respectively capture subjects to the left and right of the vehicle 10. As an alternative example, the first imaging apparatus 1 may be a rear camera provided at the back of the vehicle 10 and may capture subjects on both the left and right of the vehicle 10. Such a rear camera includes a fisheye lens, for example. A controller 42 can execute the below-described processing of the present embodiment on the basis of captured images acquired from the first imaging apparatus 1 without acquiring captured images from the second imaging apparatus 2.

Figure 2:
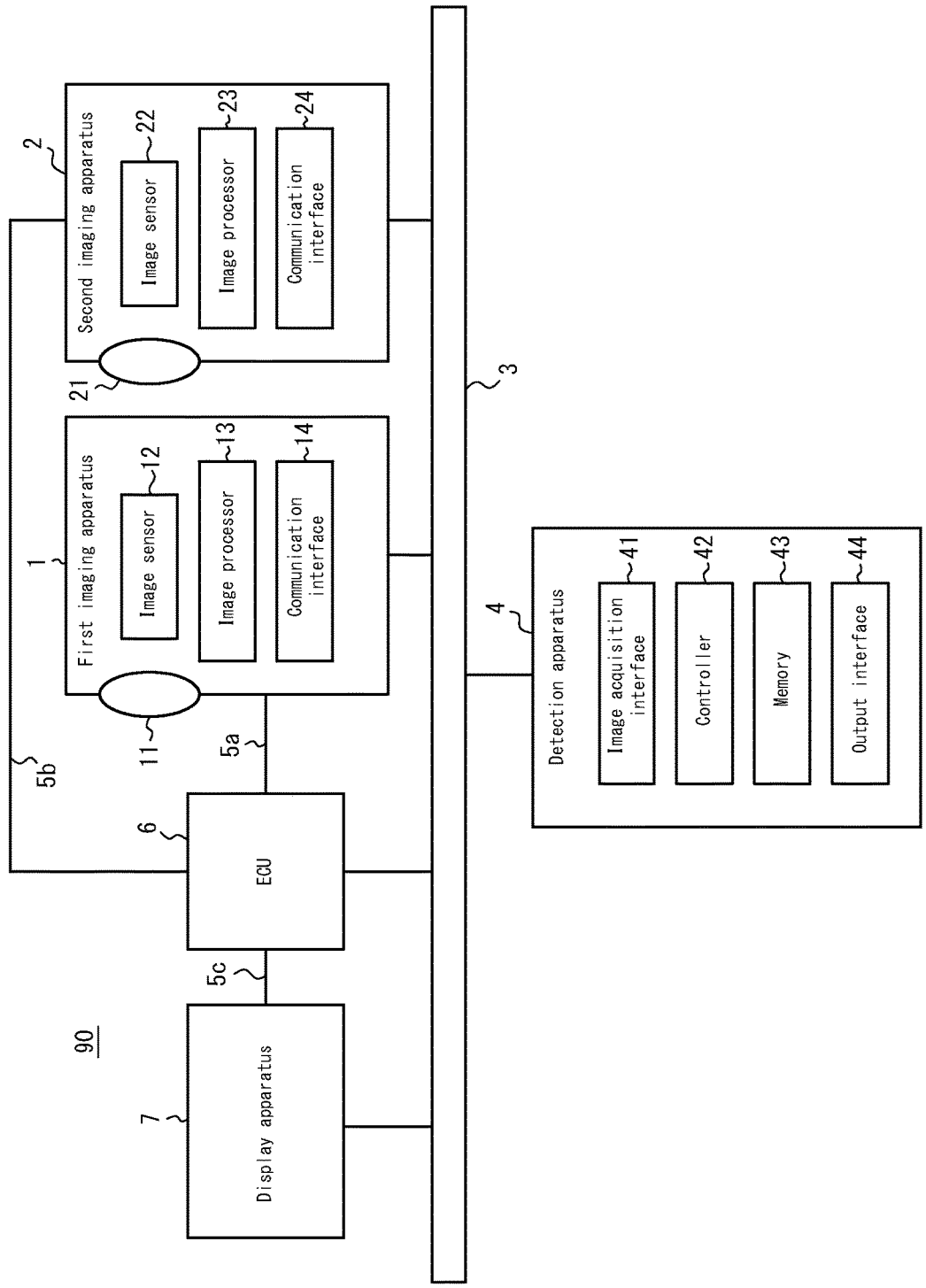
FIG. 2 is a functional block diagram of a detection system including a detection apparatus according to an embodiment of the present disclosure.

Next, the configuration of a detection system 90 installed in the vehicle 10 is described in detail with reference to FIG. 2. The detection system 90 includes the first imaging apparatus 1, the second imaging apparatus 2, a network bus 3, a detection apparatus 4, dedicated wires 5a to 5c, an electronic control unit (ECU) 6, and the display apparatus 7.

The first imaging apparatus 1 includes an optical system 11, an image sensor 12, an image processor 13, and a communication interface 14.

The optical system 11 is configured to include an aperture and a plurality of lenses and forms an image of a subject. In the present embodiment, the optical system 11 has a wide field of view and can image a subject (road edge, obstacle, or the like) in the area surrounding the vehicle 10.

The image sensor 12 is, for example, a CMOS image sensor installed in the vehicle 10 and generates captured images of the area surrounding the vehicle 10 by capturing subjects imaged by the optical system 11. Here, the image sensor 12 can generate images captured at a wide angle, since the optical system 11 has a wide field of view, as described above.

The image processor 13 performs any appropriate image processing on the analog captured image generated by the image sensor 12, such as correlated double sampling (CDS), automatic gain control (AGC), and/or analog-to-digital conversion (ADC). The image processor 13 may also use a dedicated processor for image processing, for example a digital signal processor (DSP), to perform typical image processing, such as exposure adjustment, and/or image processing corresponding to activated functions and the like.

The communication interface 14 is an interface for outputting images processed by the image processor 13 to the detection apparatus 4 or the like over the network bus 3.

The second imaging apparatus 2 includes an optical system 21, an image sensor 22, an image processor 23, and a communication interface 24. Since the functional block diagram of the second imaging apparatus 2 is similar to the functional block diagram of the first imaging apparatus 1, a description thereof is omitted.

The network bus 3 is a physical signal line conforming to a communication standard such as controller area network (CAN), Ethernet, or the like.

The detection apparatus 4 includes an image acquisition interface 41, the controller 42, a memory 43, and an output interface 44.

The image acquisition interface 41 is an interface for acquiring captured images from an imaging apparatus (at least one of the first imaging apparatus 1 and the second imaging apparatus 2) that is installed in the vehicle 10 and captures images of the area surrounding the vehicle 10. The image acquisition interface 41 also acquires control information of the vehicle 10 from the network bus 3. Information indicating the travel direction (forward or backward), speed, steering angle of the steering wheel, open or closed state of the doors, presence or absence of an instruction to open or close the doors, and the like of the vehicle 10 is included in the control information of the vehicle 10. However, the control information is not limited to these examples and may include various information related to the vehicle 10. The control information of the vehicle 10 is used by the controller 42 to detect various states of the vehicle 10.

The controller 42 is, for example, a dedicated microprocessor or a general-purpose central processing unit (CPU) that executes specific processing by reading specific programs. The controller 42 controls overall operation of the detection apparatus 4. The controller 42 can recognize vehicles, pedestrians, white lines, road edges, obstacles, and the like from the captured images acquired from the first imaging apparatus 1 and the second imaging apparatus 2. The controller 42 can measure the distance to the recognized subject by a motion stereo method or the like. The controller 42 can determine a parking space on the basis of information on distance measurement and on the recognition result. Details are provided below.

In the present embodiment, the controller 42 is provided in the detection apparatus 4, which is external to the first imaging apparatus 1. As an alternative example, one of the first imaging apparatus 1 and the second imaging apparatus 2 may be a master and the other may be a slave, and the controller 42 may be provided inside the master. In this case, the below-described parking space search process can be performed and a parking area detected by communication between the master and slave, without transmission and reception of captured images between the master and the detection apparatus 4.

The memory 43 is, for example, a memory storing a variety of information and programs necessary for the detection apparatus 4 to operate.

The output interface 44 outputs the result of the determination by the controller 42 and the like to the network bus 3.

The dedicated line 5a is a physical video signal line between the first imaging apparatus 1 and the below-described ECU 6. Video signals that conform to the national television system committee (NTSC) system, for example, are transmitted and received over the dedicated line 5a. Video signals conforming to the NTSC system, for example, are similarly transmitted and received over the below-described dedicated line 5b and dedicated line 5c.

The dedicated line 5b is a video signal line between the second imaging apparatus 2 and the below-described ECU 6.

The dedicated line 5c is a video signal line between the ECU 6 and the display apparatus 7.

The ECU 6 performs any video synthesis process, such as switching (SW) and/or image clipping, on the images or video from the first imaging apparatus 1 and the second imaging apparatus 2.

The display apparatus 7 displays images acquired from the detection apparatus 4 or the ECU 6. Therefore, the driver of the vehicle 10 can visually confirm the images. The display apparatus 7 can also receive a switching (SW) operation by the user via a button, a touch panel, or the like.

The detection method of the present embodiment is described below in detail. In the present embodiment, parking refers to parking in a first parking mode. Parking in the first parking mode refers to parking in front of or behind an obstacle (another stopped or parked vehicle) on the road.

(Parking Space Candidate Recognition Process)

Figure 3:
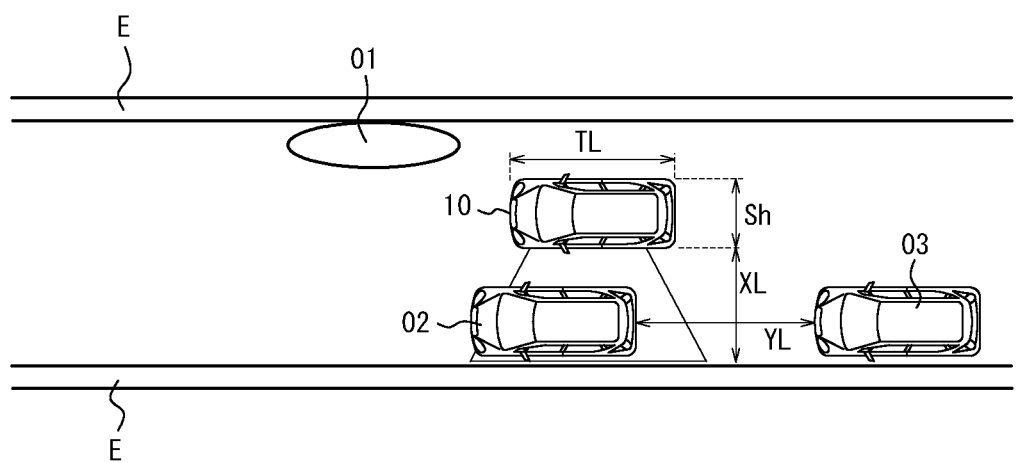
FIG. 3 illustrates an example of a vehicle on the road and the surrounding environment at the start of a parking space search process.

The controller 42 starts the parking space search process upon determining that an automatic parking function has been activated by the driver of the vehicle 10 or the like and that the first imaging apparatus 1 and the second imaging apparatus 2 have been activated. The parking space search process includes a parking space candidate recognition process, a passing space recognition process, and a road marking recognition process. The parking space candidate recognition process is for determining whether a space larger than the vehicle width, i.e. the outer dimension of the vehicle 10, exists. In the following explanation, TL and Sh respectively represent the total length of the vehicle 10 in the travel direction and the width of the vehicle 10. FIG. 3 illustrates a vehicle on the road and the surrounding environment at the start of the parking space search process.

Upon acquiring the captured images of the left side of the vehicle 10 from the first imaging apparatus 1 through the image acquisition interface 41, the controller 42 performs a road edge recognition process and an obstacle recognition process. On the basis of the captured images, the controller 42 detects a road edge, E, in the width direction on the left side of the road on which the vehicle 10 is traveling or an obstacle O2 on the road (another stopped or parked vehicle). For example, the controller 42 recognizes a subject that is 15 cm or taller as an obstacle and recognizes a subject under 15 cm tall as the road edge.

Upon determining the presence of a road edge during the road edge recognition process, the controller 42 calculates the left-side distance, XL (m), from the first imaging apparatus 1 to the road edge, E. Upon determining the presence of an obstacle during the obstacle recognition process, the controller 42 calculates the front-rear distance, YL (m), of the obstacle O2 on the basis of the speed of the vehicle 10 and changes in images, for example. The front-rear distance, YL, is the distance from the obstacle O2 to another obstacle O3 (another stopped or parked vehicle) in front of or behind the obstacle O2. The controller 42 determines whether the front-rear distance, YL, is equal to or greater than the total length, TL, of the vehicle 10 in the travel direction (information on the outer dimension of the vehicle 10). When no obstacle exists, the front-rear distance, YL, is set to a predetermined distance that is sufficiently larger than the total length, TL, of the vehicle 10 in the travel direction. In other words, the controller 42 determines whether a parking space candidate for the vehicle 10 exists in front or behind the obstacle O2. Upon determining that a parking space exists, the controller 42 sets a flag in the memory 43 indicating the existence of a parking space candidate (Pflag=1). In FIG. 3, the controller 42 determines that no parking space candidate exists (Pflag=0), since the obstacle O2 is present on the left side in the travel direction of the vehicle 10.

Figure 4:
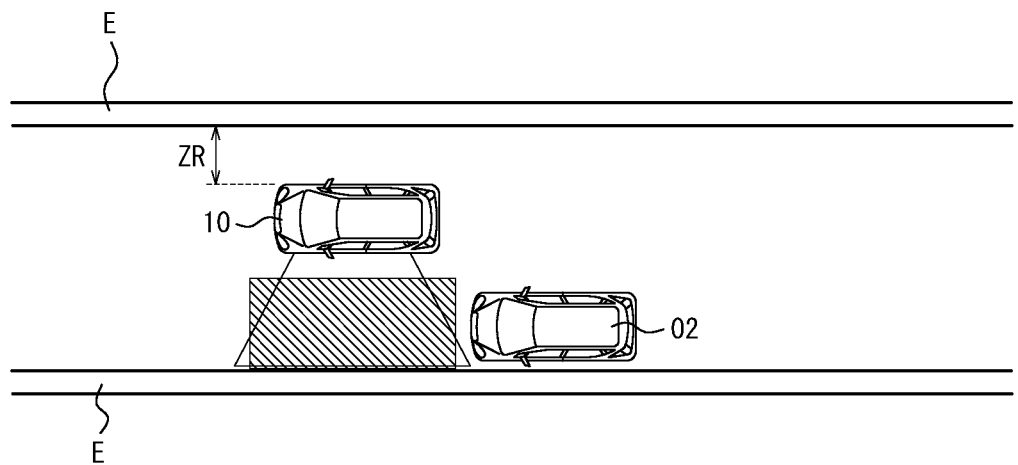
FIG. 4 illustrates an example of a vehicle on the road and the surrounding environment during a parking space candidate recognition process.

The controller 42 repeats the parking space candidate recognition process until determining that a parking space exists. At this time, the vehicle 10 may be traveling at low speed. FIG. 4 illustrates the state when the controller 42 determines that a parking space exists. Upon determining that the parking space indicated by hatching exists, the controller 42 performs the following passing space recognition process. The passing space recognition process is for determining whether there is sufficient depth for another vehicle to pass on the opposite side of the parking space candidate.

(Passing Space Recognition Process)

Upon acquiring the captured images of the right side of the vehicle 10 from the second imaging apparatus 2, the controller 42 performs the road edge recognition process and the obstacle recognition process using the captured images. Upon determining that no obstacle exists in the width direction, the controller 42 determines whether a road edge exists in the width direction, and if so, calculates the distance from the second imaging apparatus 2 to the road edge, E, as the right-side distance, ZR (m). Conversely, upon determining that an obstacle is present, the controller 42 calculates the distance from the second imaging apparatus 2 to the obstacle as the right-side distance, ZR. When no road edge exists, the controller 42 sets the right-side distance, ZR, to a predetermined value that is sufficiently larger than the below-described necessary road width.

The controller 42 determines whether the sum of the left-side distance, XL, calculated in the parking space candidate recognition process, the right-side distance, ZR, calculated in the passing space recognition process, and the vehicle width, Sh, is equal to or greater than a predetermined necessary road width. The necessary road width is the road width that needs to be set aside for other vehicles to pass by when the vehicle is parked. As an example, the necessary road width is 8.2 m in the present embodiment. The necessary road width of 8.2 m is the sum of the 0.8 m space from the road edge, E, to the vehicle 10, the 2.7 m width of the vehicle 10 (in the case of a private automobile), the 2.7 m width of another vehicle, and an extra 2 m in the left-right direction of the other vehicle. However, the setting of these values (such as the vehicle width) can be changed as necessary. The controller 42 determines whether the following inequality (1) holds (for parking in the first parking mode).

$$XL+ZR+Sh \geq 8.2 \qquad (1)$$

Figure 5:
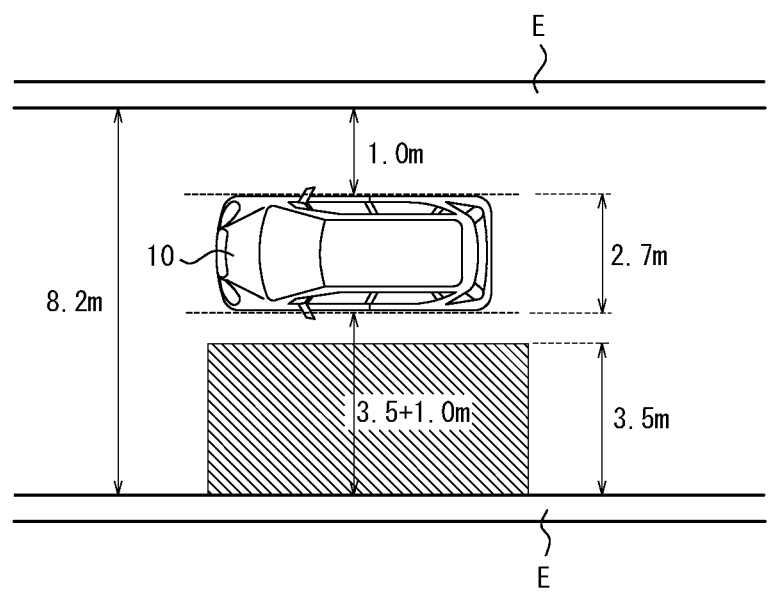
FIG. 5 illustrates a first example of the positional relationship between a parking space on the road and a vehicle during a parking space search.

FIG. 5 illustrates an example of the positional relationship between a parking space on the road and the vehicle 10 during a parking space search when, for example, XL=4.5 (m), ZR=1.0 (m), and the vehicle width, Sh, =2.7 (m). The hatched portion is a parking space candidate. For the sake of simplicity, no obstacle is illustrated in FIG. 5. In this case, XL+ZR+Sh=8.2. Since the aforementioned inequality (1) holds, the controller 42 determines that parking is possible.

Figure 6:
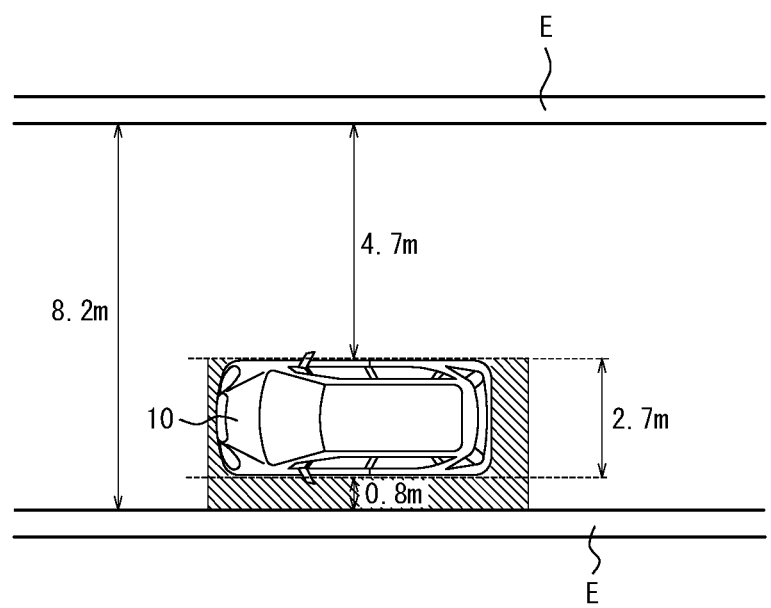
FIG. 6 illustrates a second example of the positional relationship between a parking space on the road and a vehicle during a parking space search.

FIG. 6 illustrates an example of the positional relationship between a parking space on the road and the vehicle 10 during a parking space search when, for example, XL=0.8 (m), ZR=4.7 (m), and the vehicle width, Sh, =2.7 (m). In this case, XL+ZR+Sh=8.2. Since the aforementioned inequality (for parking in the first parking mode) holds, the controller 42 determines that parking is possible.

In the present embodiment, parking refers to parking in the first parking mode. However, in another embodiment, parking in the first parking mode may refer to parallel parking, i.e. parking between a plurality of other vehicles that are parked in a line. In an alternative example, parking may refer to parking in a second parking mode. Parking in the second parking mode refers to parking alongside, i.e. to the left or right of an obstacle (another stopped or parked vehicle) on the road. The controller 42 may determine whether to park in the first parking mode or the second parking mode in accordance with input from the user, or the controller 42 may determine whether parking is possible in each of the first parking mode and the second parking. Furthermore, the controller 42 may determine the parking mode (parking in the first parking mode or parking in the second parking mode) of another vehicle that is already parked nearby and may determine whether the vehicle 10 can be parked in the same mode. The controller 42 may also determine on a priority basis whether parking in the first parking mode is possible or may determine whether to park in the first parking mode or the second parking mode in accordance with the value of XL+ZR+Sh.

When parking in the second parking mode, an example of the necessary road width for parking is 10.2 m. The necessary road width of 10.2 m is the sum of the total length 5.5 m of the vehicle 10 in the travel direction, the 2.7 m width of another vehicle 10, and an extra 2 m in the left-right direction of the other vehicle. However, the setting of these values can be changed as necessary. Instead of the aforementioned inequality (1), the controller 42 determines whether the following inequality (2) holds (for parking in the second parking mode).

$$XL+ZR+Sh \geq 10.2 \qquad (2)$$

Figure 7:
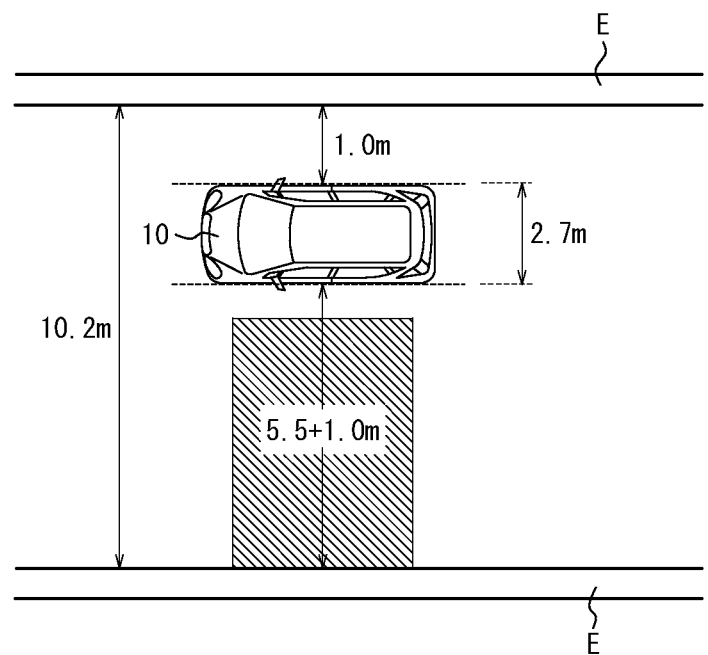
FIG. 7 illustrates a third example of the positional relationship between a parking space on the road and a vehicle during a parking space search.

FIG. 7 illustrates an example of the positional relationship between a parking space on the road and the vehicle 10 during a parking space search when, for example, XL=6.5 (m), ZR=1.0 (m), and the vehicle width, Sh, =2.7 (m). In this case, XL+ZR+Sh=10.2. Since the aforementioned inequality (2) holds, the controller 42 determines that parking is possible.

Figure 8:
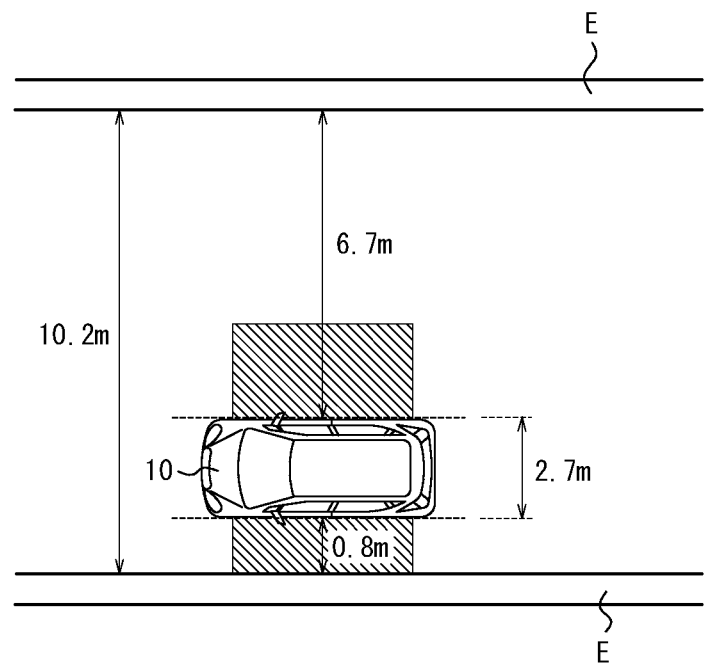
FIG. 8 illustrates a fourth example of the positional relationship between a parking space on the road and a vehicle during a parking space search.

FIG. 8 illustrates an example of the positional relationship between a parking space on the road and the vehicle 10 during a parking space search when, for example, XL=0.8 (m), ZR=6.7 (m), and the vehicle width, Sh, =2.7 (m). In this case, the controller 42 determines that the aforementioned inequality (2) holds, because XL+ZR+Sh=10.2. Since FIG. 8 illustrates the state when the vehicle 10 is searching for a parking area while traveling, the vehicle 10 is facing the travel direction (the left-right direction in the figure). Once the vehicle 10 has parked in the second parking mode, the vehicle 10 will face a direction that crosses the road (the up-down direction in the figure).

Figure 9:
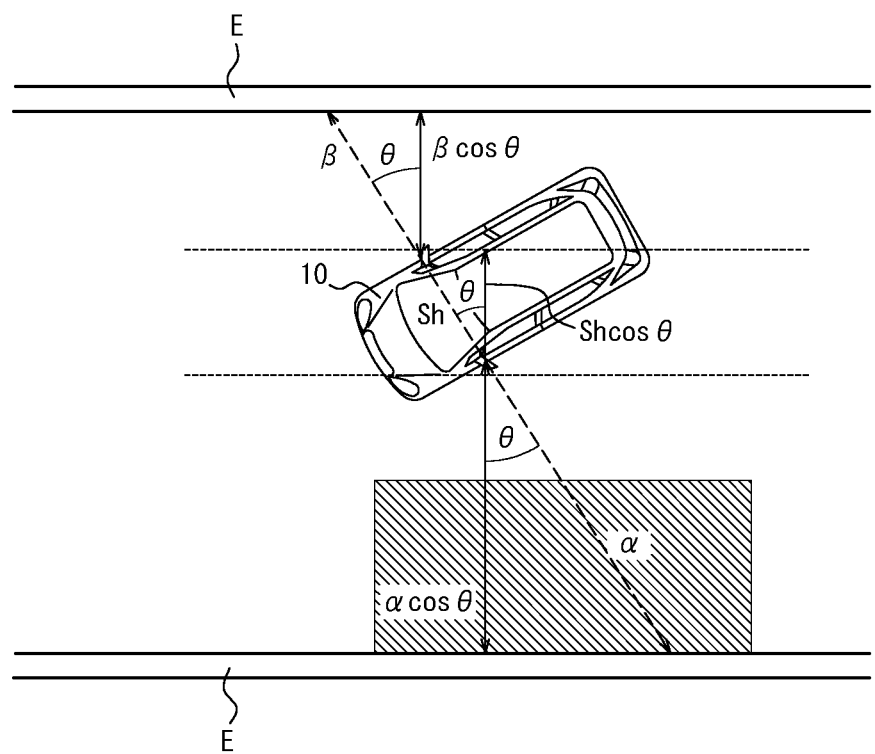
FIG. 9 illustrates a fifth example of the positional relationship between a parking space on the road and a vehicle during a parking space search.

As a different function, the controller 42 can perform the parking space candidate recognition process and the passing space recognition process even when the vehicle 10 is traveling diagonally (in a non-parallel state) relative to the road edge, E. FIG. 9 illustrates an example of the positional relationship between a parking space on the road and the vehicle 10 during a parking space search in this case. When, on the basis of information such as the steering angle of the body of the vehicle 10, the controller 42 determines that the vehicle 10 is traveling at an angle θ relative to the road edge, E, the controller 42 determines whether the following inequality (3) holds. At this time, the controller 42 calculates the distance to the road edge or an obstacle as a direction component that is perpendicular to the road edge of the distance from the first imaging apparatus 1 or the second imaging apparatus 2, which are the reference points of the vehicle 10 from which distances to the road edge or to the obstacle are measured.

$$\alpha \cos \theta + \beta \cos \theta + Sh \cos \theta \geq 8.2 \qquad (3)$$

In the case of parking in the second mode, it suffices for the right side of the aforementioned inequality (3) to be 10.2. Here, α is the distance from the reference point for measurement by the first imaging apparatus 1 of the vehicle 10 to the intersection of the optical axis of the first imaging apparatus 1 with the road edge or an obstacle on the left side of the vehicle 10, when looking in the perpendicular direction. Furthermore, β is the distance from the reference point for measurement by the second imaging apparatus 2 of the vehicle 10 to the intersection of the optical axis of the second imaging apparatus 2 with the road edge or an obstacle on the right side of the vehicle 10, when looking in the perpendicular direction.

Figure 10:
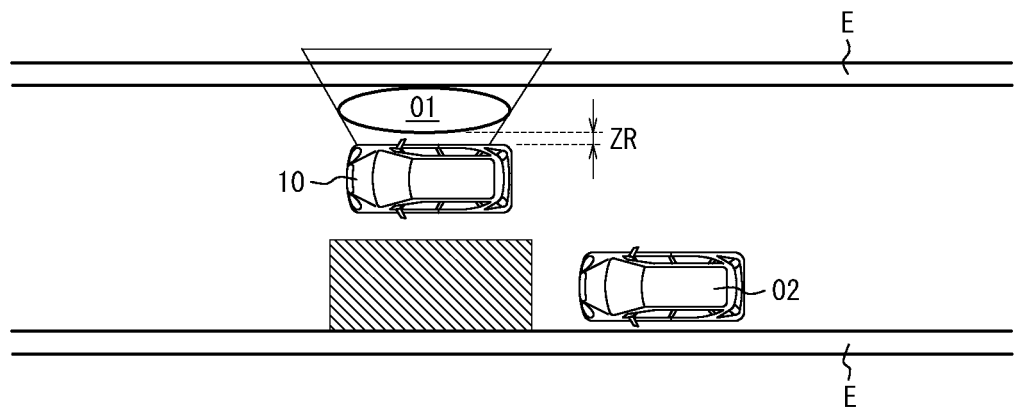
FIG. 10 illustrates an example of a vehicle on the road and the surrounding environment during a passing space recognition process.

Returning now to the passing space recognition process, when the vehicle 10 is traveling parallel to the road edge, E, the controller 42 determines that no passing space exists upon determining that the aforementioned expression (1) does not hold. The controller 42 then clears the flag in the memory 43 indicating that a passing space exists (Pathflag=0). FIG. 10 illustrates an example of the vehicle 10 on the road and the surrounding environment during the passing space recognition process at this time. In FIG. 10, the right-side distance, ZR, necessary to satisfy inequality (1) is unattainable, since an obstacle O1 is present on the right side of the vehicle 10. Therefore, the controller 42 continues the passing space recognition process while the vehicle 10 is traveling.

Figure 11:
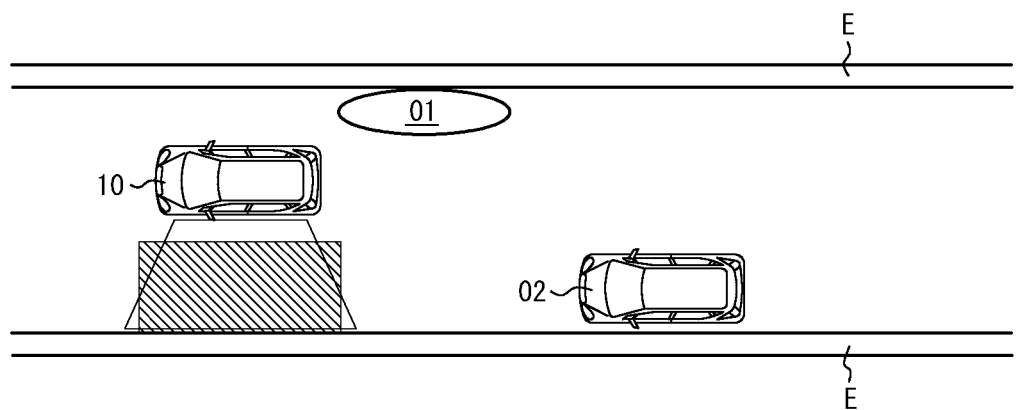
FIG. 11 illustrates an example of a vehicle and the surrounding environment after completion of the passing space recognition process.

Upon determining that the aforementioned inequality (1) holds, the controller 42 determines that a passing space exists and sets the flag indicating the existence of a passing space (Pathflag=1). FIG. 11 illustrates the vehicle and the surrounding environment after completion of the passing space recognition process.

(Road Marking Recognition Process)

Upon completion of the passing space recognition process, the controller 42 performs the road marking recognition process. The road marking recognition process is for recognizing road markings drawn on the road, road signs installed on the road, and the like and to determine whether a parking space can be definitively selected.

For example, the controller 42 determines that parking is not possible when recognizing a no-parking marking or a disabled marking in the image captured by the first imaging apparatus 1. The controller 42 also determines that parking is not possible when determining, from the images captured by the first imaging apparatus 1 and the second imaging apparatus 2, that the vehicle 10 is within 5 m of an intersection. At this time, the controller 42 sets a flag indicating that parking is prohibited in the memory 43 (Wflag=1). Conversely, the controller 42 clears this flag in the memory 43 when determining that parking is possible (Wflag=0).

Figure 12:
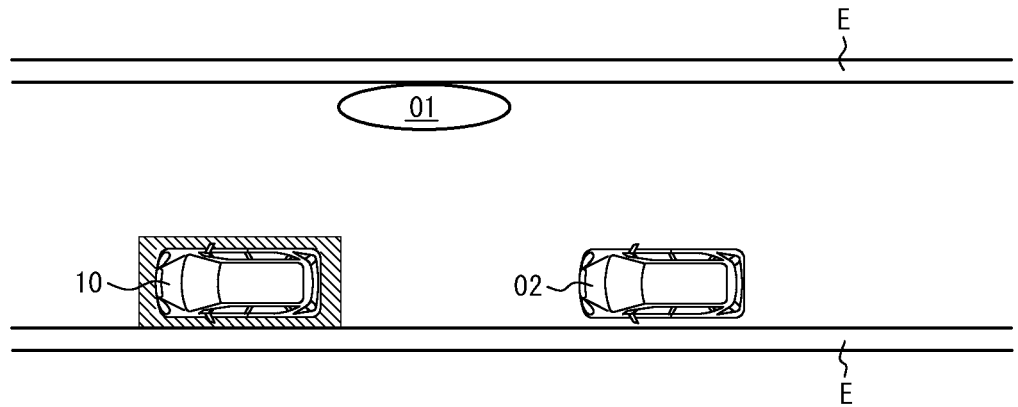
FIG. 12 illustrates an example of a vehicle on the road and the surrounding environment upon completion of a road marking recognition process and automatic parking control.

The controller 42 refers to the memory 43 and determines whether the condition "Pathflag=1 and Wflag=0" is satisfied. When the condition is satisfied, the vehicle 10 performs automatic parking control and parks itself in the parking space that was found in the parking space candidate recognition process. FIG. 12 illustrates an example of the vehicle 10 and the surrounding environment upon completion of the automatic parking control. Since a variety of techniques have been proposed as methods of automatic parking control, further description is omitted.

In the present embodiment, the vehicle 10 is parked on the left side in the travel direction. However, the controller 42 may instead determine whether parking is possible on the right side in the travel direction by performing the passing space recognition process on the basis of captured images from the first imaging apparatus 1 and performing the parking space candidate recognition process on the basis of captured images from the second imaging apparatus 2.

Figure 13:
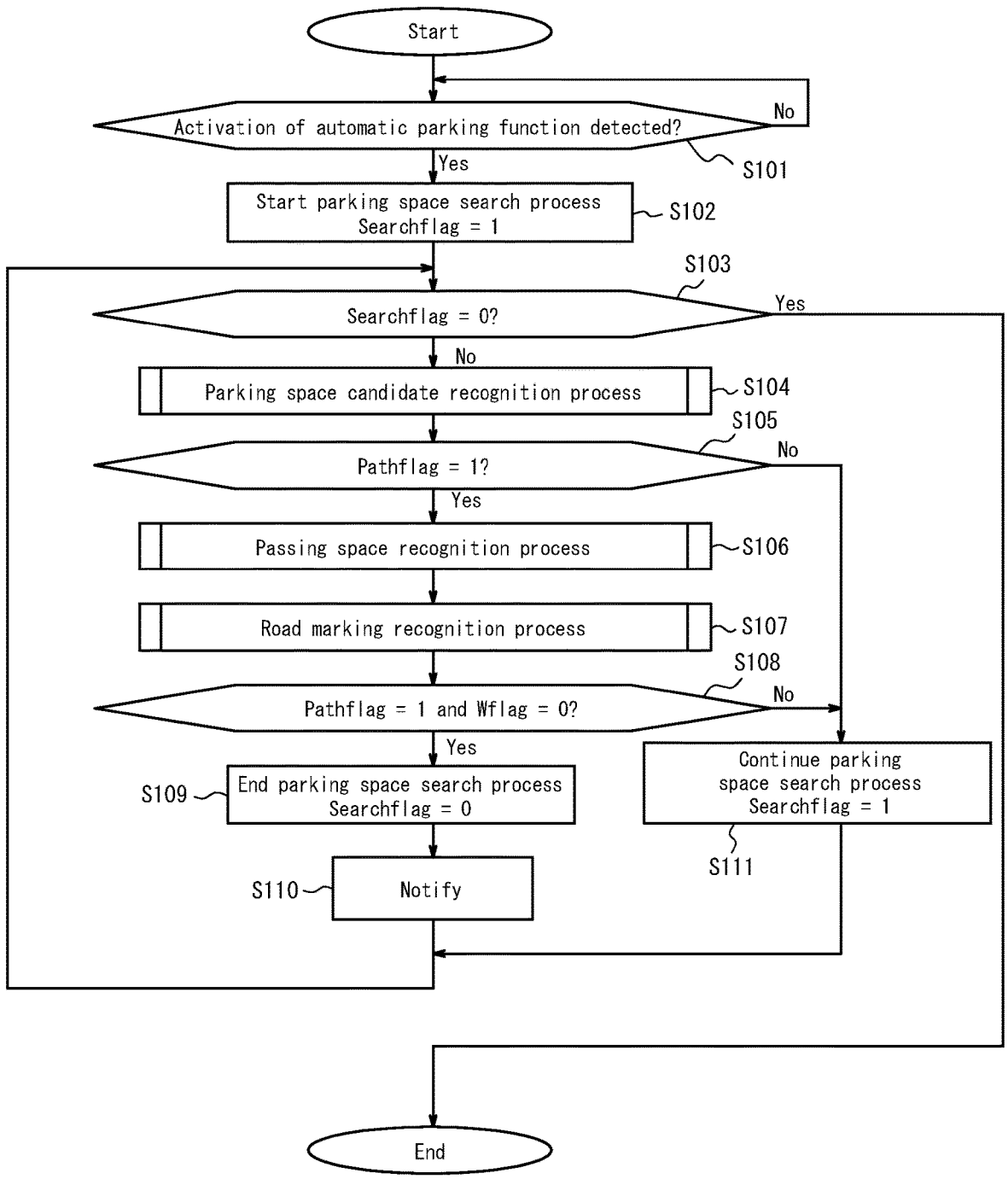
FIG. 13 is a flowchart illustrating operations by a controller in the detection apparatus of FIG. 2.

FIG. 13 is a flowchart illustrating operations by the controller 42 of the detection apparatus 4. The operations by the controller 42 are described below in accordance with FIG. 13.

In step S101, the controller 42 determines whether the automatic parking function is activated. When the result of step S101 is Yes, the controller 42 sets the Searchflag in the memory 43, i.e. Searchflag=1, in step S102. The Searchflag is a flag indicating the state of the parking space candidate recognition process. When step S101 is No, the controller 42 repeats step S101.

In step S103, the controller 42 determines whether Searchflag=0 and terminates the processing flow when the result of step S103 is Yes.

Conversely, when the result of step S103 is No, the controller 42 performs the parking space candidate recognition process in step S104. Details on step S104 are provided in FIG. 14.

Next, in step S105, the controller 42 determines whether Pflag=1 in the memory 43. As described above, Pflag is a flag indicating whether a parking space candidate exists. When the result of step S105 is No, the controller 42 continues the parking space candidate recognition process in step S111 and therefore leaves the Searchflag set, i.e. Searchflag=1.

Conversely, when the result of step S105 is Yes, the controller 42 performs the passing space recognition process in step S106. Details on step S106 are provided in FIG. 15. After step S106, the controller 42 performs the road marking recognition process in step S107. Details on step S107 are provided in FIG. 16.

In step S108, the controller 42 next determines whether "Pathflag=1 and Wflag=0" is satisfied. As described above, Pathflag and Wflag are flags respectively indicating that a parking space exists and that parking is prohibited. When the result of step S108 is Yes, the controller 42 completes the parking space search process in step S109 and clears the Searchflag, i.e. Searchflag=0. Conversely, when the result of step S108 is No, the controller 42 continues the parking space search process in step S111 and therefore leaves the Searchflag set, i.e. Searchflag=1.

In step S110 after step S109, the controller 42 notifies other control apparatuses of the vehicle 10 over the network bus 3 that automatic parking is possible. After step S110 or step S111, the controller 42 executes step S103.

Figure 14:
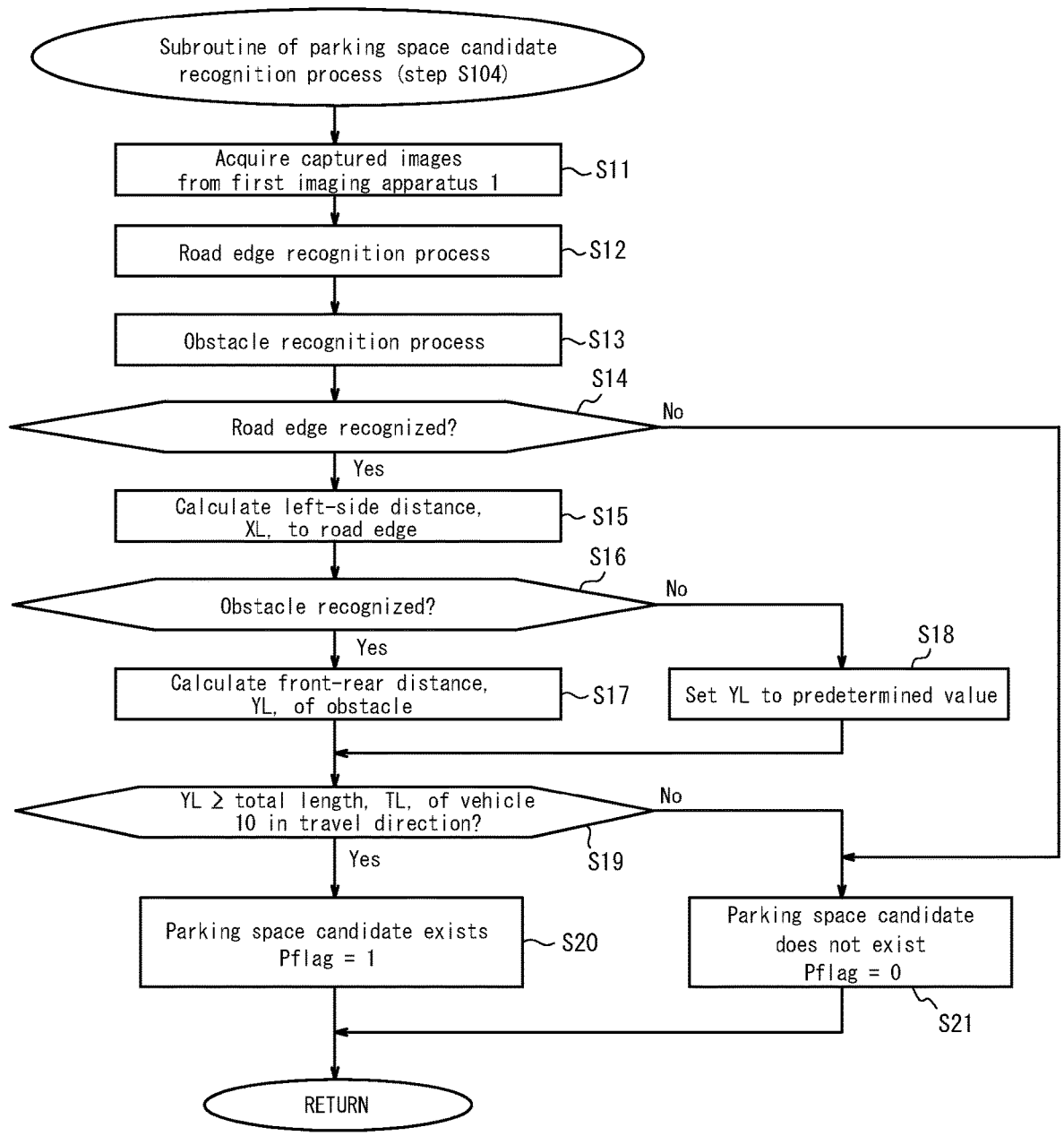
FIG. 14 illustrates a subroutine of a parking space candidate recognition process in FIG. 13.

FIG. 14 illustrates a subroutine of step S104 (the parking space candidate recognition process). The parking space candidate recognition process of FIG. 14 is described below.

In step S11, the controller 42 acquires captured images from the first imaging apparatus 1. In step S12 and step S13, the controller 42 uses the captured images to perform the road edge recognition process and the obstacle recognition process.

Next, in step S14, the controller 42 determines whether a road edge has been recognized. When the result of step S14 is No, the controller 42 determines in step S21 that no parking space candidate exists and clears the Pflag, i.e. Pflag=0. Conversely, when the result of step S14 is Yes, the controller 42 calculates the left-side distance to the road edge and sets XL to the result in step S15. In step S16, the controller 42 determines whether an obstacle has been recognized during the obstacle recognition process.

When the result of step S16 is Yes, the controller 42 calculates the front-rear distance, YL, of the obstacle in step S17. When the result of step S16 is No, the controller 42 sets the front-rear distance, YL, in step S18 to a predetermined value that is sufficiently larger than the total length, TL, of the vehicle 10 in the travel direction.

After step S17 or step S18, the controller 42 determines in step S19 whether the front-rear distance, YL, is equal to or greater than the total length, TL, of the vehicle 10 in the travel direction. When the result of step S19 is Yes, the controller 42 sets the Pflag in the memory 43, i.e. Pflag=1, in step S20 to indicate that a parking space candidate exists.

Conversely, when the result of step S19 is No, the controller 42 clears the Pflag, i.e. Pflag=0, in step S21 to indicate that no parking space candidate exists.

Figure 15:
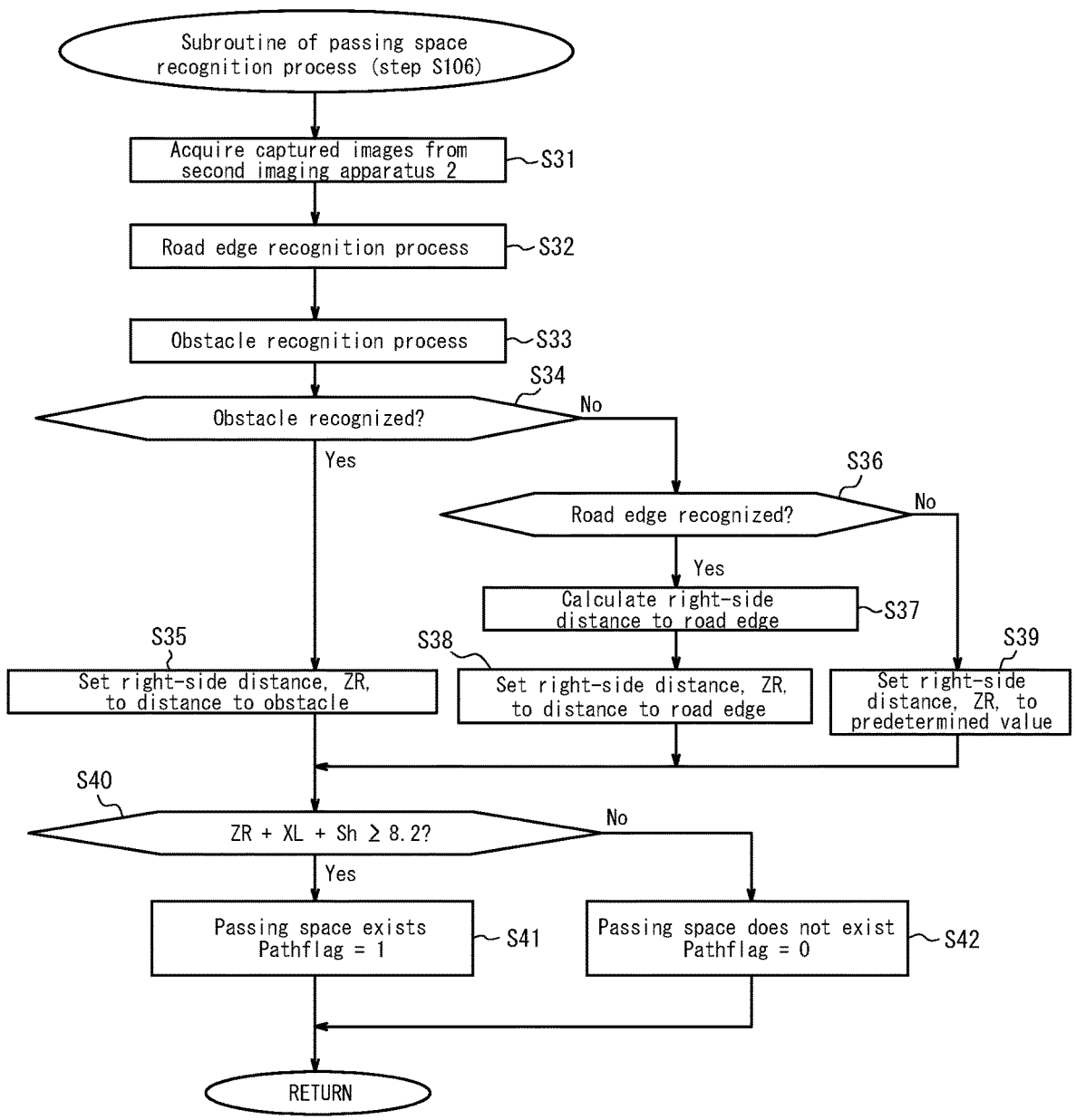
FIG. 15 illustrates a subroutine of a passing space recognition process in FIG. 13.

FIG. 15 illustrates a subroutine of step S106 (the passing space recognition process).

In step S31, the controller 42 acquires captured images from the second imaging apparatus 2. In step S32 and step S33, the controller 42 uses the captured images to perform the road edge recognition process and the obstacle recognition process.

In step S34, the controller 42 determines whether an obstacle has been recognized during the obstacle recognition process. When the result of step S34 is Yes, the controller 42 calculates the right-side distance, ZR, to the obstacle in step S35. When the result of step S34 is No, the controller 42 determines in step S36 whether a road edge has been recognized in the road edge recognition process. When the result of step S36 is Yes, the controller 42 calculates the distance to the road edge in step S37. In step S38, the controller 42 sets the right-side distance, ZR, to this distance. When the result of step S36 is No, the controller 42 in step S39 sets the right-side distance, ZR, to a sufficiently larger value than the necessary road width (for example, the maximum imagable distance).

In step S40 after step S35, step S38, or step S39, the controller 42 determines whether expression (1), i.e. the inequality ZR+XL+Sh (vehicle width)≥8.2, holds. Expression (1) indicates a condition for parking in the first parking mode. When parking in the second parking mode, the controller 42 determines whether the inequality in expression (2) holds, in which the right side of expression (1) is set to 10.2. The controller 42 may determine whether parking is possible in both of the first parking mode and the second parking mode or may make the determination for only one of the modes. When the result of step S40 is Yes, the controller 42 determines in step S41 that a passing space exists and sets the Pathflag in the memory 43, i.e. Pathflag=1. Conversely, when the result of step S40 is No, the controller 42 determines in step S42 that a passing space does not exist and clears the Pathflag, i.e. Pathflag=0.

Figure 16:
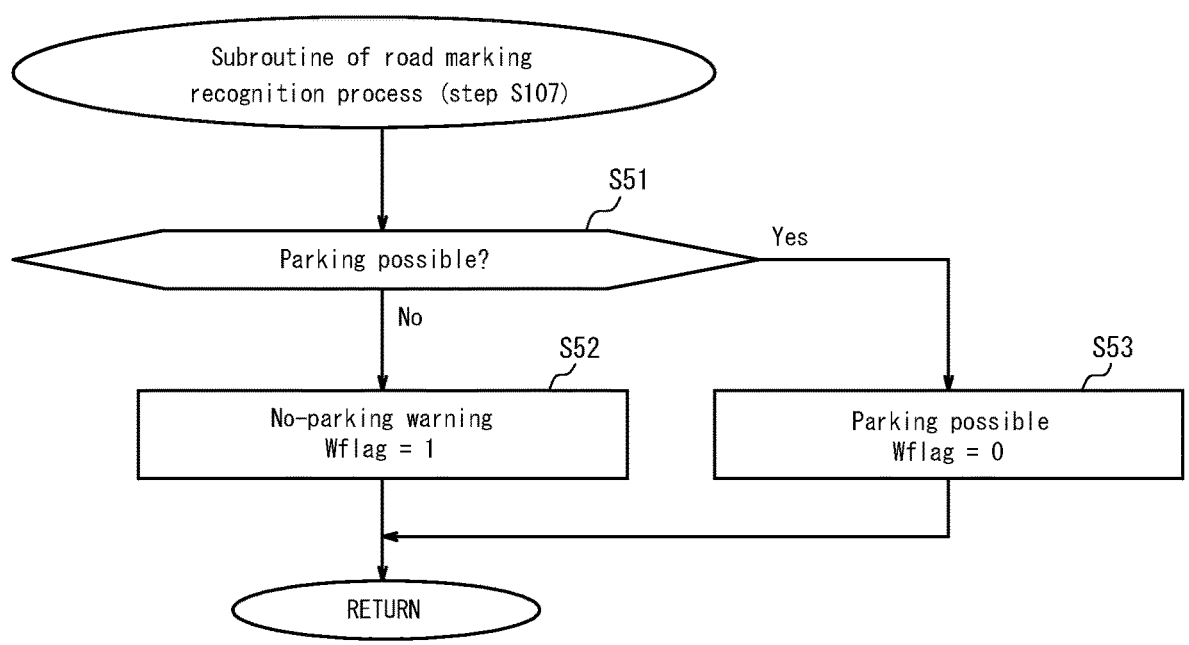
FIG. 16 illustrates a subroutine of a road marking recognition process in FIG. 13.

FIG. 16 illustrates a subroutine of step S107 (the road marking recognition process).

In step S51, the controller 42 determines whether parking is possible. Specifically, the controller 42 determines that parking is not possible when recognizing a no-parking marking or a disabled marking. The controller 42 also determines that parking is not possible when determining that the vehicle 10 is within 5 m of an intersection. At this time, the controller 42 sets the Wflag in the memory 43, i.e. Wflag=1, in step S52. Conversely, upon determining that parking is possible, the controller 42 clears the Wflag in the memory 43, i.e. Wflag=0, in step S53.

According to the present embodiment, the controller 42 calculates, on the basis of captured images acquired from the first imaging apparatus 1 and the second imaging apparatus 2, the distance from the first imaging apparatus 1 or the second imaging apparatus 2 to the road edge of the road on which the vehicle 10 is traveling or to an obstacle on the road. Furthermore, on the basis of the calculated distance and information on the outer dimension of the vehicle 10, the controller 42 determines whether travel on the road by other vehicles will be possible after the vehicle 10 has parked on the road. Therefore, the controller 42 determines whether the vehicle can park in a parking space without parking lines, for example, after taking into consideration the size of the vehicle to determine whether there is room for other vehicles to travel on the road. Accordingly, the controller 42 can detect an appropriate parking position that does not obstruct other vehicles. Furthermore, automatic parking can be implemented at low cost without necessarily increasing the number of on-vehicle devices.

The controller 42 in the present embodiment can use the vehicle width, Sh, or the total length, TL, in the travel direction as information on the outer dimension of the vehicle 10 to determine whether other vehicles can travel on the road when the vehicle 10 parks in the first parking mode or the second parking mode. Therefore, the controller 42 can accurately determine whether other vehicles can travel on the road in accordance with whether the vehicle 10 parks in the first parking mode or the second parking mode.

The controller 42 of the present embodiment determines whether travel on the road by other vehicles will be possible after the vehicle 10 has parked on the road on the basis of a direction component, perpendicular to the road edge, of the distance from the first imaging apparatus 1 or the second imaging apparatus 2 to the road edge or to an obstacle. Therefore, the controller 42 can accurately calculate the width of the road even when the vehicle 10 is traveling at an angle (in a non-parallel state) relative to the road edge.

Although an embodiment of the present disclosure has been described based on embodiments and drawings, it is to be noted that various changes and modifications will be apparent to those skilled in the art based on the present disclosure. Therefore, such changes and modifications are to be understood as included within the scope of the present disclosure. For example, the functions and the like included in the various members, units, steps, and the like may be reordered in any logically consistent way. Furthermore, when embodying a method according to the present disclosure, units or steps may be combined into one or divided.

The controller 42 of the detection apparatus 4 according to an embodiment of the present disclosure may be configured by a computer. In this case, a program containing a description of the processing for achieving the functions is stored within the computer or in an external memory, and the controller 42 is implemented by the CPU of the computer reading and executing the program. Such a program can, for example, be distributed by the sale, transfer, lending, or the like of a portable recording medium such as a digital versatile disk (DVD) or a compact disk-read only memory (CD-ROM). Such a program can also, for example, be distributed by being stored in the memory of a server on a network and then transferred from the server to another computer over the network. For example, the computer that executes such a program can temporarily store, in its own memory, the program recorded on the portable recording medium or transferred from the server. As another embodiment of the program, a computer may read the program directly from the portable recording medium and execute processing in accordance with the program. Furthermore, each time the program is transferred from the server to the computer, the computer may execute processing in accordance with the received program.

The invention claimed is:

1. A detection apparatus comprising:
a controller configured to calculate, on a basis of captured images captured by an imaging apparatus that is installed in a vehicle and captures images of an area surrounding the vehicle, a distance from the imaging apparatus to a road edge in a width direction of a road on which the vehicle is traveling or to an obstacle on the road and to determine whether travel on the road by other vehicles, which is possible before the vehicle has parked on the road, will still be possible after the vehicle has parked on the road, on a basis of a road width in which the other vehicles can travel, the road width being determined by a calculated distance and information on an outer dimension of the vehicle which represents a boundary of the road width, wherein the controller determines whether travel on the road by the other vehicles will be possible after the vehicle has performed parking in a first parking mode or parking in a second parking mode respectively on a basis of a vehicle width or a total length in a travel direction as the outer dimension of the vehicle, and parking in the first parking mode includes parking in front of or behind the obstacle on the road, and parking in the second parking mode includes parking to a left or a right of the obstacle on the road.

2. The detection apparatus of claim 1, wherein the controller determines whether travel on the road by the other vehicles will be possible after the vehicle has parked on the road using a direction component that is perpendicular to the road edge of the distance from the imaging apparatus to the road edge or the obstacle.

3. An imaging apparatus comprising:

a controller configured to calculate, on a basis of captured images captured by an imaging device that is installed in a vehicle and captures images of an area surrounding the vehicle, a distance from the imaging apparatus to a road edge in a width direction of a road on which the vehicle is traveling or to an obstacle on the road and to determine whether travel on the road by other vehicles, which is possible before the vehicle has parked on the road, will still be possible after the vehicle has parked on the road, on a basis of a road width in which the other vehicles can travel, the road width being determined by a calculated distance and information on an outer dimension of the vehicle which represents a boundary of the road width, wherein the controller determines whether travel on the road by the other vehicles will be possible after the vehicle has performed parking in a first parking mode or parking in a second parking mode respectively on a basis of a vehicle width or a total length in a travel direction as the outer dimension of the vehicle, and parking in the first parking mode includes parking in front of or behind the obstacle on the road, and parking in the second parking mode includes parking to a left or a right of the obstacle on the road.

4. A vehicle in which an imaging apparatus is installed, wherein the imaging apparatus comprises:

a controller configured to calculate, on a basis of captured images captured by an imaging device that is installed in a vehicle and captures images of an area surrounding the vehicle, a distance from the imaging apparatus to a road edge in a width direction of a road on which the vehicle is traveling or to an obstacle on the road and to determine whether travel on the road by other vehicles, which is possible before the vehicle has parked on the road, will still be possible after the vehicle has parked on the road, on a basis of a road width in which the other vehicles can travel, the road width being determined by a calculated distance and information on an outer dimension of the vehicle which represents a boundary of the road width, wherein the controller determines whether travel on the road by the other vehicles will be possible after the vehicle has performed parking in a first parking mode or parking in a second parking mode respectively on a basis of a vehicle width or a total length in a travel direction as the outer dimension of the vehicle, and parking in the first parking mode includes parking in front of or behind the obstacle on the road, and parking in the second parking mode includes parking to a left or a right of the obstacle on the road.

5. A detection method used in a detection apparatus, the detection method comprising:

calculating, on a basis of captured images captured by an imaging apparatus that is installed in a vehicle and captures images of an area surrounding the vehicle, a distance from the imaging apparatus to a road edge in a width direction of a road on which the vehicle is traveling or to an obstacle on the road; and determining whether travel on the road by other vehicles, which is possible before the vehicle has parked on the road, will still be possible after the vehicle has parked on the road, on a basis of a road width in which the other vehicles can travel, the road width being determined by a calculated distance and information on an outer dimension of the vehicle which represents a boundary of the road width, wherein the determining determines whether travel on the road by the other vehicles will be possible after the vehicle has performed parking in a first parking mode or parking in a second parking mode respectively on a basis of a vehicle width or a total length in a travel direction as the outer dimension of the vehicle, and parking in the first parking mode includes parking in front of or behind the obstacle on the road, and parking in the second parking mode includes parking to a left or a right of the obstacle on the road.

6. The imaging apparatus of claim 3, wherein the controller determines whether travel on the road by the other vehicles will be possible after the vehicle has parked on the road using a direction component that is perpendicular to the road edge of the distance from the imaging apparatus to the road edge or the obstacle.

7. The vehicle in which an imaging apparatus is installed of claim 4, wherein the controller determines whether travel on the road by the other vehicles will be possible after the vehicle has parked on the road using a direction component that is perpendicular to the road edge of the distance from the imaging apparatus to the road edge or the obstacle.

8. The detection apparatus of claim 1, wherein the controller recognizes a road marking drawn on the road on the basis of the captured images to determine whether parking of the vehicle is possible.

* * * * *